United States Patent
Eick et al.

(10) Patent No.: US 9,133,699 B2
(45) Date of Patent: Sep. 15, 2015

(54) ELECTRICAL METHODS FRACTURE DETECTION VIA 4D TECHNIQUES

(75) Inventors: Peter M. Eick, Houston, TX (US); Joel D. Brewer, Houston, TX (US); Frank D. Janiszewski, Richmond, TX (US)

(73) Assignee: ConocoPhillips Company, Houston, TX (US)

(*) Notice: Subject to any disclaimer, the term of this patent is extended or adjusted under 35 U.S.C. 154(b) by 561 days.

(21) Appl. No.: 13/323,416

(22) Filed: Dec. 12, 2011

(65) Prior Publication Data

US 2012/0152529 A1 Jun. 21, 2012

Related U.S. Application Data

(60) Provisional application No. 61/423,425, filed on Dec. 15, 2010.

(51) Int. Cl.
| | |
|---|---|
| E21B 47/00 | (2012.01) |
| E21B 43/267 | (2006.01) |
| C09K 8/80 | (2006.01) |
| E21B 49/00 | (2006.01) |

(52) U.S. Cl.
CPC ............... *E21B 43/267* (2013.01); *C09K 8/80* (2013.01); *E21B 47/00* (2013.01); *E21B 49/006* (2013.01)

(58) Field of Classification Search
CPC ...... E21B 43/26; E21B 49/006; E21B 43/267
USPC ...................... 166/250.1, 280.2, 280.1, 308.1
See application file for complete search history.

(56) References Cited

U.S. PATENT DOCUMENTS

| | | | |
|---|---|---|---|
| 4,446,433 A | 5/1984 | Shuck | |
| 5,600,318 A | 2/1997 | Li | |
| 6,116,342 A | 9/2000 | Clark et al. | |
| 6,330,914 B1 | 12/2001 | Hocking et al. | |
| 7,073,581 B2 | 7/2006 | Nguyen et al. | |
| 7,082,993 B2 | 8/2006 | Ayoub et al. | |
| 7,210,526 B2 | 5/2007 | Knobloch | |
| 7,424,911 B2 | 9/2008 | McCarthy et al. | |
| 7,450,053 B2 | 11/2008 | Funk et al. | |
| 7,451,812 B2 | 11/2008 | Cooper et al. | |
| 7,712,527 B2 | 5/2010 | Roddy | |
| 7,726,397 B2 | 6/2010 | McDaniel et al. | |
| 7,754,659 B2 | 7/2010 | Rediger et al. | |
| 2005/0017723 A1 | 1/2005 | Entov et al. | |
| 2005/0274510 A1 | 12/2005 | Nguyen et al. | |
| 2007/0256830 A1* | 11/2007 | Entov et al. | 166/250.1 |
| 2009/0166030 A1 | 7/2009 | Zhuravlev et al. | |
| 2009/0179649 A1 | 7/2009 | Schmidt | |
| 2009/0250216 A1 | 10/2009 | Bicerano | |
| 2009/0288820 A1 | 11/2009 | Barron et al. | |
| 2010/0017139 A1 | 1/2010 | Adams et al. | |
| 2010/0038083 A1 | 2/2010 | Bicerano | |
| 2010/0147512 A1 | 6/2010 | Cramer et al. | |
| 2010/0157730 A1 | 6/2010 | Bradford | |
| 2010/0157737 A1 | 6/2010 | Miller et al. | |

FOREIGN PATENT DOCUMENTS

| | | |
|---|---|---|
| WO | WO2009151891 | 12/2009 |
| WO | WO2010019424 | 2/2010 |

OTHER PUBLICATIONS

Brian Anderson, et al., Autonomous Nodes for Time Lapse Reservoir Seismic: An Alternative to Permanent Seabed Arrays, PESA News, Jun./Jul. 2009, pp. 52-54.
PCT/US2011/064465 PCT International Search Report (PCT/ISA 210) Dated Apr. 4, 2012.

* cited by examiner

*Primary Examiner* — Nicole Coy
(74) *Attorney, Agent, or Firm* — ConocoPhillips Company

(57) ABSTRACT

Method for acquiring and evaluating geometry of a well includes deploying at least one grid of geophysical sensors, wherein the at least one grid of the sensors is deployed in a 2D or 3D configuration; acquiring an initial geophysical survey of geophysical parameters of the well; fracturing the well creating a fracture while simultaneously; injecting an electrically active proppant into the fracture, wherein the electrically active proppant is injected into the fracture during fracturing, after fracturing or during and after fracturing; continuously acquiring a geophysical survey of geophysical parameters of the well during the fracturing; and acquiring a final geophysical survey of geophysical parameters of the fracture upon completion of the fracturing.

5 Claims, No Drawings

ELECTRICAL METHODS FRACTURE DETECTION VIA 4D TECHNIQUES

CROSS-REFERENCE TO RELATED APPLICATIONS

This application claims priority benefit under 35 U.S.C. Section 119(e) to U.S. Provisional Patent Ser. No. 61/423,425 filed on Dec. 15, 2010 the entire disclosure of which is incorporated herein by reference.

FIELD OF THE INVENTION

This invention relates to a method for acquiring and evaluating the geometry of a fracture.

BACKGROUND OF THE INVENTION

Retrieving hydrocarbons from subterranean reservoirs is becoming more difficult, as existing reserves are depleted and production becomes more expensive. It has been estimated that mature fields account for up to 70% of the world's production or more. In order to increase production, reservoirs are often hydraulically fractured to stimulate production of hydrocarbons from the wellbore. Hydraulic fractures are created in subterranean formations by hydraulically injecting water or high viscosity fluid (also referred to as fracturing fluid) containing a proppant at a high flow rate into a wellbore and forcing the fracturing fluid against the formation strata by pressure. The formation strata or rock is forced to crack, creating or enlarging one or more fractures. The proppant subsequently prevents the fracture from closing completely and thus provides improved flow of recoverable fluid, i.e., oil, gas or water.

Because aging wells often produce from multiple intervals, some very thin, the ability to locate these stimulation treatments with pinpoint accuracy is a key to more effective remediation and increased ultimate recovery. Also in more "non-conventional" plays like the fractured shales, the quality and extent of the fracture job is paramount to the financial success of the well and the play. However, few methods exist for accurately visualizing fracture length, proppant penetration, and estimated flow in the new fracture are required in order to accurately assess production capabilities and the need for further remediation before production is initiated.

Numerous techniques exist for detecting the fracture geometry of a well using various imaging techniques. For example, Hocking et al., U.S. Pat. No. 6,330,914, provides a method for monitoring a propagating vertical fracture in a formation by injecting conductive fracture fluid into the formation to initiate and propagate the fracture; energizing the fracture fluid via an electrical voltage while the fracture propagates; and measuring the inducted electromagnetic field parameters to judge about the fracture development and geometry. Further, McCarthy, et al., WO2007013883, provides introducing a target proppant; transmitting electromagnetic radiation from about 300 megahertz-100 gigahertz; and analyzing a reflected signal from the target particle to determine fracture geometry. Lastly, Nguyen et al., U.S. Pat. No. 7,073,581, describes electro-conductive proppant compositions and related methods of obtaining data from a portion of a subterranean formation. These techniques focus on detecting data utilizing a series of geophones connected to conventional seismic equipment, which converts ground movement, i.e., displacement, into voltage.

Additionally, fractures can be monitored and approximately mapped three-dimensionally during the fracturing process by a micro-seismic technique. The micro-seismic technique detects sonic signatures from rocks cracking during the fracturing process. The setup of this technique is prohibitively expensive to do routinely, and the data that is generated tends to be relatively inaccurate due to high background noise. Further, the process can only be performed during the fracturing process and cannot be repeated thereafter.

Although these techniques yield useful information, its usefulness is limited to fracture locations near the wellbore and yields little if any useful information relating to the dimensions of the fracture as it extends into the formation. Therefore, a need exists for monitoring and mapping fractures as they extend away from the oil or gas well.

SUMMARY OF THE INVENTION

In an embodiment, a method for acquiring and evaluating the geometry of a well includes: (a) deploying at least one grid of geophysical sensors, wherein the at least one grid of the sensors is deployed in a 2D or 3D configuration; (b) acquiring an initial geophysical survey of geophysical parameters of the well; (c) fracturing the well creating a fracture while simultaneously; (d) injecting an electrically active proppant into the fracture, wherein the electrically active proppant is injected into the fracture during fracturing, after fracturing or during and after fracturing; (e) continuously acquiring a geophysical survey of geophysical parameters of the well during the fracturing; and (f) acquiring a final geophysical survey of geophysical parameters of the fracture upon completion of the fracturing.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

The present invention provides methods of acquiring and measuring geophysical survey data, i.e., resistivity, induced potential, electromagnetic properties, magnetic properties and similar data, of a fracture. Specifically, the present invention accounts for acquiring geophysical survey data prior to the fracturing process, during the fracturing process while a proppant is injected into the fracture, and upon completion of the fracturing process.

As used herein a "proppant" is a composition of sized particles mixed with fracturing fluid to open and/or hold fractures open during and after a hydraulic fracturing treatment. In addition to naturally occurring sand grains, the sized proppant particles can be man-made or specially engineered particles, such as resin-coated sand or high-strength ceramic materials like sintered bauxite. Proppant particles are carefully sorted for size and sphericity to provide an efficient conduit for hydrocarbon production to the wellbore.

Alternatively, an "electrically active proppant" may be utilized. As used herein an "electrically active proppant" contains either electrically active sized proppant particles, electrically active fracture fluid or both electrically active particles and fluids. For example, U.S. application Ser. No. 12/621,789 demonstrates visualizing reservoir fractures using electrically active proppants to carry electrical signals throughout the fracture and detecting the electrical signals at the surface. The electrically active proppant may include conductive particles, reactive particles, resistive particles, magnetic particles, or carry an electrical charge.

In operation, an electrical signal transmitted into the fracture charges the electrically active proppant. The electrical signal can also comprise, for example, an electrical signal, an electromagnetic signal, a sonic signal, a microwave signal, or any other signal suitable for the intended purpose. Alternatively, an electrically active liquid can induce an electrical signal. The electrically active liquid can include, for example, natural brine, drilling fluids, fresh water and combinations thereof. The electrical signal is conducted along and reflected back from the electrically active proppant and detected by at least a grid of sensors.

The grid of sensors can measure, for example, acoustics, conductivity, self potential, induced potential, resistivity, gravity, and electromagnetic and magnetic geophysical properties used for geophysical surveys. The types of sensors utilized can include geophones, hydrophones, accelerometers, electrodynamic receivers, conductivity or resistivity probes, and any combinations thereof. The grid of sensors can either be externally disposed, i.e., surface based, or internally disposed, i.e., within the wellbore. The grid of sensors does not actually have to be laid out in a grid per se. They can be distributed in a non-uniform manner by design or to accommodate cultural or natural obstacles. For ease of discussion, we will call them a "grid" even though they may not be laid out that way. The grid of sensors may be arranged in 2D or 3D grid configuration on the surface over the area around the wellbore or can be located at multiple levels in the wellbore. The extent of the grid of sensors can be adjusted to suit the resolution and read requirements of the individual well or the geographical and geophysical constraints of the project. The grid of sensors is time stamped and synchronized to global positioning time (GPS), so a baseline survey can be readily measured. When deployed on the surface, the sensors are often referred to as a sensor package or a receiver package.

It may be necessary to convert the data provided by the grid of sensors into voltage based signals compatible with conventional 24 bit seismic survey equipment, such as a conventional seismic recorder. By converting the electrical methods data from the sensor into an electrical signal that the seismic recorder can accurately measure, the seismic data node records simultaneous measurements of the desired geophysical field in real time. In an embodiment, a seismic interface box is utilized which understands the low voltages from field equipment and converts the data into a voltage signal that can then be digitized by the seismic data equipment and stored. For example, Eick et al., U.S. patent application Ser. No. 13/297,456, demonstrates a method and apparatus for evaluating the geometry of a fracture, specifically relates to an electric methods seismic interface box and a method of using the apparatus to record electrical methods geophysical data.

The converted data is then sent to the geophysical survey equipment as a compatible voltage signal. In an embodiment, the geophysical survey equipment includes a conventional wire based seismic recording system. The conventional wire based seismic data recorder can telemetry the data at or near real time back to the seismic data recorder. In another embodiment, the seismic data recorder can be a wireless or radio based recording system. These systems bring the data either in real time or near real time or can store the data locally and control it from the recorder. In the preferred embodiment, the seismic survey equipment includes an autonomous seismic node. The autonomous seismic node is a data collection unit that works independently of other units and is not required to be controlled by radio telemetry or similar techniques during the course of the seismic survey. The autonomous seismic node may include a receiver, a field timer, a standard timer, a transmitter and a battery. In an embodiment, data is stored in a temporary drive at the autonomous seismic node until it is transferred either physically or wireless for data analysis. Autonomous or semi-autonomous seismic nodes may also be utilized in the present invention.

Separation of the regional, i.e., the Earth's natural field, drill rig noise ambient power lines etc., from the residual field, i.e., the field caused by the fracture or the detection problem, in 3D operations may be a cause for concern during magnetic methods applications. Since the equipment is fully deployed many measurements can be made to develop a summed and stacked average background prior to the start of the fracture. Thus, it may be beneficial to measure the regional field prior to, during and after the fracturing process. By collecting and stacking a block of data, the Earth's magnetic variations could be minimized and the regional field removed with the background sensors. While this approach is demonstrated with the magnetic technique, the same summing and stacking of the prior, during and post fracture field could be applied to any of the geophysical techniques being measured.

Additionally, during and after the fracture initiation, the seismic survey equipment can be running continuously mapping the propagation of the fracture in 3D until it has stabilized. At which time another series of measurements can be made to establish the post fracture field. The post fracture field is a composite of the regional field and the fracture field. Thus, the difference between the pre- and the post-fracture measurements would be caused by the fracture itself and therefore a 4D measurement would accurately describe the fracture and eliminate the regional residual separation problem. By including the prior knowledge of the wellbore and fracture start point depth and direction, and given a constrain to the inversion of the residual 4D field to a specific area one could accurate locate and map the fracture body.

In an embodiment, a 4D or time varying experiment is conducted. The time varying experiment is conducted by first placing the sensor packages, seismic interface box and preferably an autonomous seismic data node in a 3D configuration of sufficient size to detect the anomalies expected, for example as a grid. The seismic recording system can also be wireless or wire-based if real-time telemetry is needed. The station spacing, orientation, line spacing or even grid spacing would be modeled and determined based upon prior modeling of the expected fracture size and dimensions. The sensor packages and seismic interface box are laid out and connected to the preferred autonomous seismic data nodes until the complete spread is deployed and tested. Next, a base line survey is run for each of the geophysical methods that the receivers set up to measure, establish and ensure a good baseline survey was conducted prior to starting the fracture to establish the "regional" field. The baseline survey may be repeated many times and the results summed or "stacked" to additionally suppress the random background noise of any individual sample. Next, the fracture job is initiated with minimal disturbance of the surface equipment to keep the "residual" field as easily detectable as possible. During this time the autonomous seismic data nodes, seismic interface boxes and receivers are constantly recording the fractures progress. By continuously recording the data during the fracture, segments of the data can be summed and then stacked to reduce the background noise and make the fracture detection easier. Additionally in this way segments of the data sufficient to be summed and then stacked to reduce background noise can be extracted at anytime during the experiment to create a near time continuous movie. These segments can overlap to assure sufficient data and a more time continuous sampling during the experiment. After the fracture breaks, a series of repeated surveys are conducted to establish the post fracture state of the geophysical fields and again, this data may be summed or stacked as needed to establish the appropriate signal to noise ratio required for detection. This data set then constitutes a 4D data set where the only change that occurred was caused by the fracture generation and the injection of the proppant material into the fracture. Because we have a priori information of the fracture injection depth and location and geophysical properties, the determination of the fracture geometry is reasonably precisely constrained and can be modeled or inverted for.

In another embodiment, the procedure above can be modified to allow a proppant with tuned geophysical properties that can take advantage of the particular geologic situation that the fracture was being generated to maximize the resolution of the technique. For example, in a resistive shale, one can inject a highly conductive proppant and then apply a coded electrical signal to form an antenna like transmitter in the shale that can be detected and modeled to determine fracture size and extent.

To measure and evaluate the geometry of a fracture, for example in the case of magnetic survey data, a grid of sensors may be deployed and properly oriented. If necessary, the data received from the grid of sensors in the form of an electrical signal may need to be converted into a voltage signal compatible with seismic survey equipment. The Earth's total and oriented field (depending on the sensor) is measured prior to the fracturing process. During the fracturing process, proppant containing magnetic particles in injected into the fracture and magnetic survey data is continuously taken in order to track the propagation of the proppant into the fracture. Finally, a complete magnetic survey is collected at the end of the fracturing process in order to map the final extent of the proppant in the fractures.

As another example, a similar approach to the magnetic method can be applied if measuring the gravitational field by injecting a heavy dense bismuth tungsten based proppant instead of more conventional materials. By making the proppant very dense, the local gravitational field would be modified and then could be detected by 4D methods.

In determining induced polarization, for example, a coded time varying electrical current is injected into the conductive proppant before and after the fracture is completed. A probe is lowered to the fracture level and a time varying current is applied to the conductive proppant material in the well and the fracture. These pulses can be sent every few seconds and then the polarity shifts. On the surface, the sensor package, interface box and autonomous seismic nodes measure the decay of the pulses and map the conductivity and induced polarization of the rock and the proppant material can be measured. In determining resistivity, for example, grids of sensors are deployed on the surface over the area around the wellbore.

In determining resistivity, for example, the resistance between the electrical probes a grid of sensors is deployed and properly oriented. Prior to the fracturing process relevant geophysical data is collected. During the fracturing process, proppant containing resistive material is injected into the fracture, an external electrical signal stimulates the proppant, and the relevant geophysical data is continuously acquired in order to track the propagation of the proppant into the fracture. Finally, a complete geophysical survey is collected at the end of the fracturing process in order to map the final extent of the proppant in the fracture. If necessary, the data received from the grid of sensors prior to, during and after the fracturing process is converted into a voltage signal compatible with the seismic survey equipment.

In determining self potential, for example, the voltage of the electrodes can be periodically measured and mapped. The measurements are started prior to fracturing process. Measurements continue during the fracturing process while the proppant containing a substance when exposed to a activator creates a battery is introduced into the fracture. When exposed to an activator such as natural brine, drilling fluids, fresh water or combinations thereof, the proppant conducts electrons much like a weak battery. Measurements may be continued during and after fracturing process. From this data the direction, magnitude and extent of the fracture can be determined.

In closing, the above examples are diagrammatic of the basic concept that artificially and naturally occurring fractures can be detected via time varying (4D) survey methods and electrical reactive geophysical techniques. It should also be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Ser. No. 12/621,789 filed Nov. 19, 2009, Cramer, et al., "Controlled Source Fracture Monitoring."

2. U.S. patent application Ser. No. 13/297,456 filed Nov. 16, 2011, Eick et al., "Electrical Method Seismic Interface Box."

3. U.S. Pat. No. 6,330,914 Hockings et al., "Method and Apparatus for Tracking Hydraulic Fractures in Unconsolidated and Weakly Cemented Soils and Sediments."

4. WO2007013883 published Feb. 1, 2007, Hexion Specialty Chemicals, "Method of Estimating Fracture Geometry, Compositions and Articles Used for the Same."

The invention claimed is:
1. A method for acquiring and evaluating geometry of a well comprising:

a. deploying at least one grid of geophysical sensors, wherein the at least one grid of the sensors is deployed in a 2D or 3D configuration;
b. acquiring a baseline geophysical survey of geophysical parameters of the well;
c. fracturing the well to create a fracture;
d. injecting an electrically active proppant into the fracture, wherein the electrically active proppant is characterized by self-potential upon contact with an activating subterranean fluid;
e. introducing an activating subterranean fluid into the fracture to activate the self-potential of the electrically active proppant;
f. continuously acquiring a geophysical survey of the self-potential of the electrically active proppant during the fracturing; and
g. acquiring a final geophysical survey of geophysical parameters of the fracture upon completion of the fracturing.

2. The method according to claim 1, wherein the at least one grid of sensors is connected to seismic survey equipment.

3. The method according to claim 2, wherein the seismic survey equipment includes a seismic interface box and a seismic data recorder.

4. The method according to claim 1, wherein the electrically active proppant is a suitable proppant for stimulating data desired to be collected.

5. The method according to claim 1, wherein the proppant material injected has particular geophysical parameters to be measured that includes electric, electromagnetic properties, resistivity, or gravitimetric magnetic properties.

* * * * *